(12) United States Patent
Kimura et al.

(10) Patent No.: US 6,192,017 B1
(45) Date of Patent: Feb. 20, 2001

(54) METHOD AND APPARATUS FOR REDUCING THE WIDTH OF MARKS WRITTEN IN OPTICAL MEDIA

(75) Inventors: Nob Kimura, Torrance; Daniel Wu, Cerritos, both of CA (US)

(73) Assignee: Discovision Associates, Irvine, CA (US)

( * ) Notice: Under 35 U.S.C. 154(b), the term of this patent shall be extended for 0 days.

(21) Appl. No.: 09/404,223

(22) Filed: Sep. 23, 1999

Related U.S. Application Data (63) Continuation of application No. 08/897,867, filed on Jul. 21, 1997, now Pat. No. 5,991,252.

(51) Int. Cl.[7] .................................................. G11B 7/00
(52) U.S. Cl. ............................. 369/59; 369/54; 369/116
(58) Field of Search .................................. 369/59, 47, 48, 369/49, 50, 54, 58, 116, 13

(56) References Cited

U.S. PATENT DOCUMENTS 5,289,453 * 2/1994 Ohno et al. ..................... 369/116 X
5,367,514 * 11/1994 Kobayashi et al. .............. 369/116 X
5,381,396 * 1/1995 Tanaka et al. ....................... 369/116

* cited by examiner

Primary Examiner—Muhammad Edun
(74) Attorney, Agent, or Firm—Keiji Masaki; Donald Wenskay; Richard Stokey (57) ABSTRACT

The present invention includes a method and apparatus for reducing the width of a mark written in optical media. When forming a long mark, the prior art recording methods typically cause blooming at the edges of the mark, resulting in a wide mark pattern which may be sensed by the read focused spot reading an adjacent track causing increased adjacent track crosstalk (ATC). However, by removing every other pulse from the write pulse waveform, the cooling sequence of the writing process is sufficiently increased to allow for additional cooling between pulses. When forming marks with less pulses, the effects of blooming are substantially reduced. Thus, because of the reduction in the effect of blooming, the problems associated with ATC, whereby adjacent track information is recorded, is substantially reduced.

35 Claims, 5 Drawing Sheets

METHOD AND APPARATUS FOR REDUCING THE WIDTH OF MARKS WRITTEN IN OPTICAL MEDIA

CROSS-REFERENCE TO RELATED APPLICATIONS

This application is a continuation of U.S. patent application Ser. No. 08/897,867, filed Jul. 21, 1997, now U.S. Pat No. 5,991,252, entitled Method and Apparatus for reducing the Width of Marks Written in Optical Media.

FIELD OF THE INVENTION

The present invention is related, generally, to a method and apparatus for reducing the width of a mark written in optical media, and more particularly, to removing predetermined pulses from a write pulse waveform thereby reducing the cooling sequence of the writing process.

BACKGROUND OF THE INVENTION

As a result of, inter alia, the increased use of multimedia computers, the demand for higher density storage in optical media is increasing. The capacity of the optical media (i.e., optical disks and/or the like), which is typically based on the density of the information in the optical media, has substantially increased in recent years and exponential growth in the capacity of optical media is planned over the next few years. As an example of the density increase, the 4X generation of optical media commonly has a capacity of about 2.6 GB and the more recently developed 8X generation commonly has a capacity of about 5.2 GB.

When increasing the capacity of an optical disk, the separation of the spiral tracks (each track is typically comprised of a groove between two lands) commonly formed on the surface of the optical disk is substantially reduced such that the individual track lands are typically less than 1 um apart from each other. Numerous marks (also known as domains), the size of which are typically determined by the length of a binary representation of a data field, are commonly recorded in the grooves between the track lands (see FIG. 1). Due to the decreased distance between adjacent tracks on the high density optical disk, the formation of a mark substantially in a groove between two adjacent track lands often becomes increasingly difficult.

To write a mark within a track or to increase the number of marks on an optical disk, a sufficiently small optical beam is typically required. Shorter wavelength lasers and higher numerical aperture lenses for the reading and writing devices typically determine the beam spot size, and consequently, the size of each mark. Thus, to decrease the size of the optical beam, a high power semi-conductor red laser (685 nm) is most often utilized when writing the magnetic code onto the optical disk. However, the 685 nm laser typically provides the shortest wavelength laser beam currently available in the market. Moreover, the numerical aperture is often restricted to be less than about 0.55 in common implementations. Thus, a further substantial reduction in the size of the optical beam by a shorter wavelength or larger numerical aperture written onto the optical disk presents practical problems.

Because of the limitations in reducing the size of the focused optical beam, the larger beam spot often extends beyond the width of a single groove in a high density optical disk and, at times, senses a signal pattern from the adjacent groove (see FIG. 1), thereby resulting in a problem known as adjacent track crosstalk (ATC). ATC typically becomes a more pronounced problem when writing longer period (T) data onto a high-density optical disk.

Figure 2:
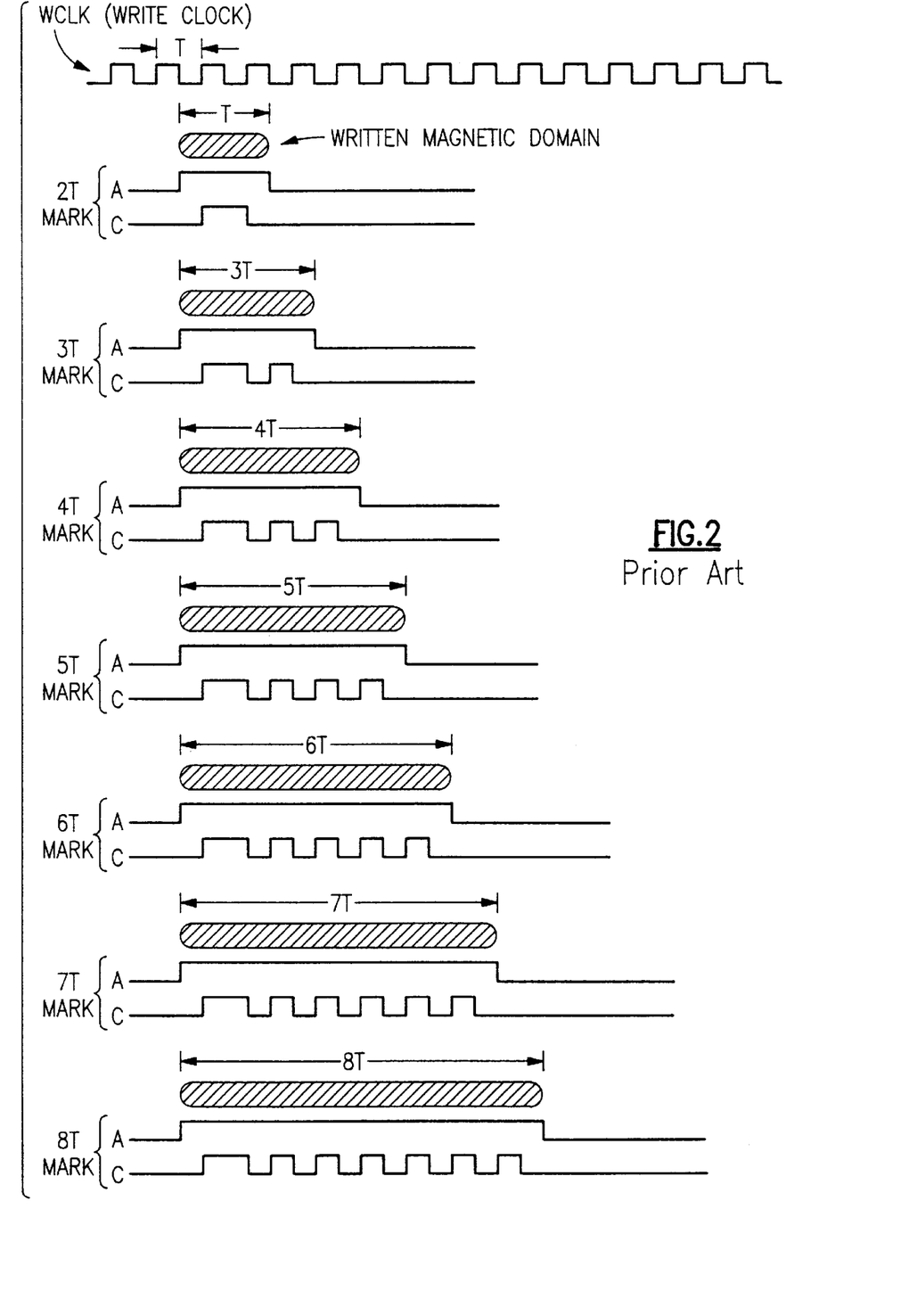
FIG. 2 shows an exemplary prior art recording method used in obtaining crosstalk measurements by showing an exemplary write clock corresponding to exemplary encoded data patterns and corresponding written magnetic domains for 2T–8T marks in accordance with a preferred embodiment of the present invention.

More particularly, when writing a long mark (i.e., 5T and larger) onto an optical disk, an increased laser power is often required because of the additional pulses in the pulse sequence. For each pulse, the optical media is usually heated then cooled. However, for subsequent pulses, the optical media is usually heated again before the cooling process for the previous pulse is sufficiently completed. Consequently, the resulting mark is typically wider, as shown in FIG. 2, because of the lack of proper cooling in between pulses. Moreover, the excess heat commonly results in blooming. Blooming is a common problem whereby the excess heat increases the width of the mark, as is evident in FIG. 2. The problems associated with ATC are often expressed when reading adjacent to tracks with excessively wide marks.

Figure 1:
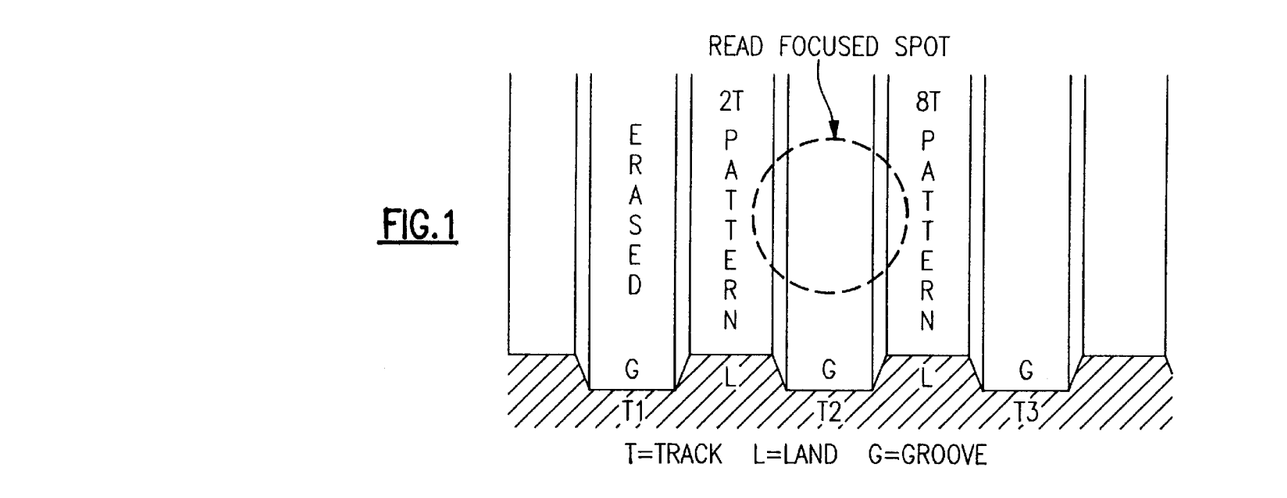
FIG. 1 shows a schematic magnified view of adjacent tracks on an optical disk containing small and large marks, with large marks demonstrating adjacent track crosstalk.

Specifically, when reading from a disk, the laser beam commonly analyzes each mark within the track. When ATC exists, the data contained within the excessively long mark is partially sensed by the read focused spot when the reading process occurs on an adjacent track. The amount of crosstalk that is coupled to the read focused spot is typically proportional to the length of the mark and spacing between marks. For example, and as shown in FIG. 1, when reading a 2T pattern, the read focused spot may sense an 8T pattern located in an adjacent track. If the amount of the adjacent track signal pattern which is sensed by the read focused spot is greater than about 10% of the 2T pattern signal amplitude, excessive jitter typically occurs, thereby decreasing the reliability in the read channel. Consequently, because 8T is the longest mark and 2T is the shortest mark, the maximum amount of crosstalk will often enter into the smallest signal amplitude of the 2T pattern. The typical crosstalk measured on a track separation of about 0.85 um and a 2T mark length of about 0.53 um are shown below:

| Data Pattern | Crosstalk |
| --- | --- |
| 2T mark, 2T space | −36 dB |
| 3T mark, 3T space | −33 dB |
| 4T mark, 4T space | −30 dB |
| 5T mark, 5T space | −26 dB |
| 6T mark, 6T space | −22 dB |
| 7T mark, 7T space | −18 dB |
| 8T mark, 8T space | −14 dB |

FIG. 2 shows a typical prior art recording method used in obtaining these crosstalk measurements by showing an exemplary write clock corresponding to exemplary encoded data (each line "A") having respective exemplary write pulses on each line "C" and exemplary written magnetic domains for 2T–8T marks.

An apparatus and method is needed for reducing the width of larger period marks on high density optical disks, thereby substantially reducing blooming and ATC.

SUMMARY OF THE INVENTION

The present invention includes a method and apparatus for reducing the width of a mark written in optical media. When forming a long mark, the prior art recording methods typically cause blooming at the edges of the mark, resulting in a wide mark pattern which may be sensed by the read focused spot reading an adjacent track causing increased adjacent track crosstalk (ATC). However, by removing every other pulse from the write pulse waveform, the cooling sequence of the writing process is sufficiently increased to allow for additional cooling between pulses. When forming marks with less pulses, the effects of blooming are substantially reduced. Thus, because of the reduction in the effect of blooming, the problems associated with ATC, whereby adjacent track information is recorded, is substantially reduced.

To remove a pulse from a pulse sequence, each digitized binary signal to be recorded is suitably converted by a convertor to a predetermined binary signal pattern. The signals are preferably sent through a suitable digital logic circuit which suitably removes at least one predetermined pulse. The reduced pulse signal pattern is then preferably sent through a write pulse generator which suitably generates pulse waveforms corresponding to the reduced signal pattern. Depending on the waveform, each pulse is preferably sent through a specific write power sequence and then to a laser diode driver which preferably instructs a laser to preform the reduced number of pulses when heating the optical media. The reduced number of pulses allows for increased cooling between pulses and for a mark with a reduced width.

BRIEF DESCRIPTION OF THE DRAWING FIGURES

The present invention will be hereinafter described in conjunction with the appended drawing figures, wherein like numerals denote like elements, and.

DETAILED DESCRIPTION OF PREFERRED EXEMPLARY EMBODIMENTS

The present invention includes a method and apparatus for reducing the width of a mark written in high density optical disks. In general, by removing every other ½T pulse from the write pulse waveform, the heating and cooling sequence of the writing process is sufficiently altered to allow for additional cooling between pulses. When forming marks with less pulses, the effects of blooming are typically reduced. Thus, because of the reduction in blooming, the problems associated with ATC (see FIG. 1), whereby adjacent track information is inadvertently recorded, is substantially reduced.

Figure 3A:
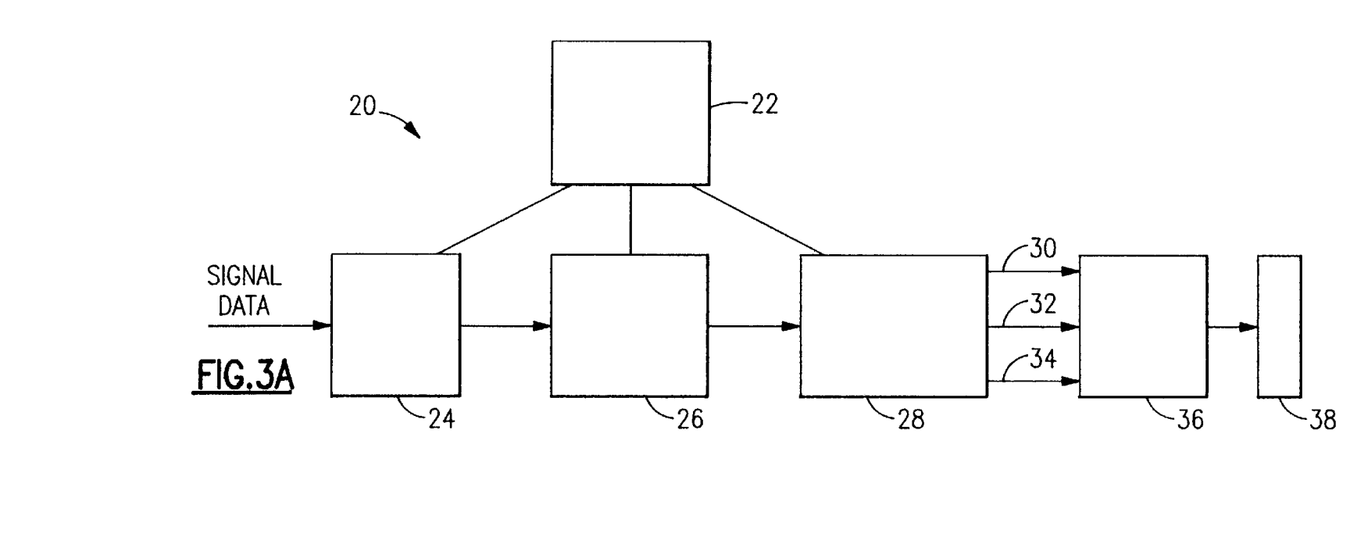
FIG. 3A shows an exemplary schematic block diagram of the apparatus for splitting the marks into shorter periods in accordance with a preferred embodiment of the present invention.
Figure 3B:
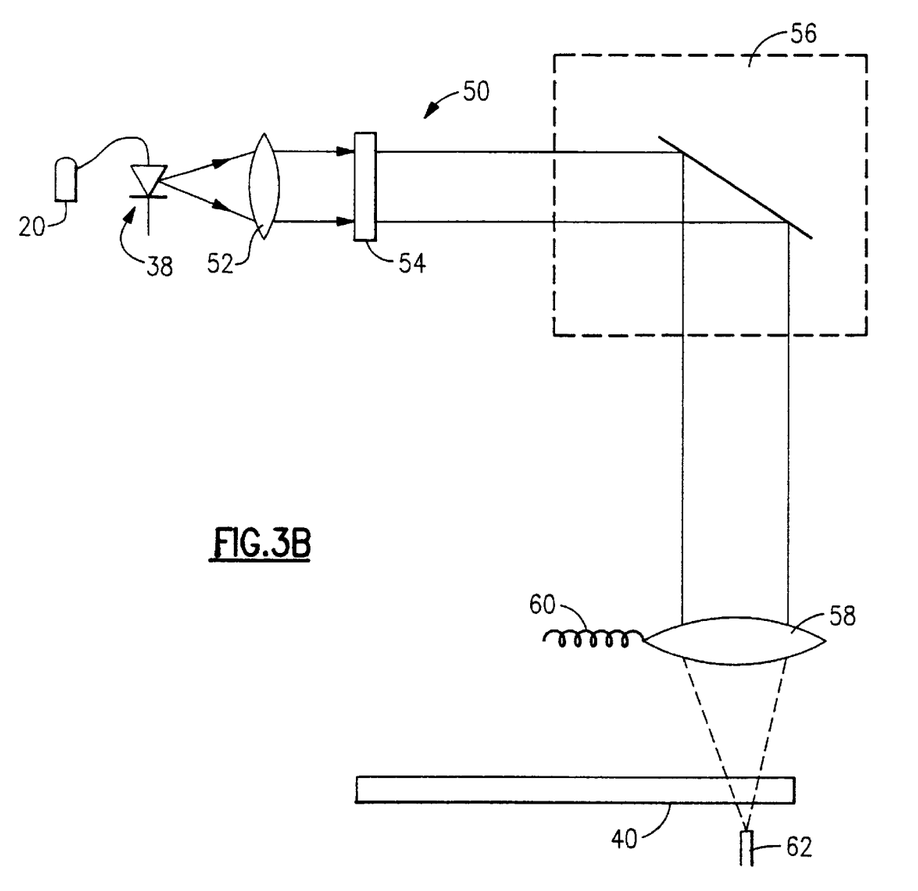
FIG. 3B shows a schematic representation of preferred optical components of an optical disk writer in accordance with a preferred embodiment of the present invention.

With momentary reference to FIG. 3B, when writing marks onto optical disk 40, present invention 20 preferably converts the input data to be recorded into suitable writing instructions for laser source 38. Generally, with respect to FIG. 3A, each digitized binary signal is suitably converted by NRZI convertor 24 to a predetermined binary signal pattern. The signal patterns are preferably sent through a digital logic circuit 26 (delete gate) which suitably deletes at least one predetermined pulse from the signal pattern. The reduced pulse signal pattern is then preferably sent through write pulse generator 28 which suitably generates a pulse sequence waveform substantially corresponding to the reduced pulse signal pattern. Depending on the waveform, each of the remaining pulses is sent through a specific write power sequence 30.32.34 to laser driver 36 which preferably communicates the instructions to laser 38 for suitably preforming the reduced number of pulses when heating optical disk 40. While a preferred embodiment of the specific components and arrangement of the components will be described below, it will be appreciated by one of ordinary skill in the art that alternative components and alternative arrangements of the components can be configured to achieve a similar system which reduces the width of a mark written in optical media. Moreover, although the present invention is described with respect to writing signal data onto an optical disk, it will be appreciated by one of ordinary skill in the art that the present invention for reducing the width of marks can be incorporated when writing onto almost any optical media.

More particularly, with continued reference to FIG. 3A, the digitized signal is preferably any suitable code capable of being converted into a binary signal pattern. In a preferred embodiment, the digitized signal is a known 1,7 RLL code (Run Length Limited Code) whereby the signals range from a minimum of about 101 to a maximum of about 100000001. In other words, the signals are preferably comprised of combinations of the following digitized signal representations:

101
1001
10001
100001
1000001
10000001
100000001.

Because the optical disk writing process is preferably based upon pulse width modulation, whereby the width of each pulse determines the information content, the input signal is suitably converted into a predetermined binary signal pattern by any suitable conversion technique capable of converting input data into a binary signal pattern. In a preferred embodiment, the input signal is sent through NRZI convertor which preforms a known Non-Return-to-Zero-Changes-On-One conversion of the input data into predetermined signal patterns whereby the signal patterns range from a minimum of about 0110 (2T mark) to a maximum of about 011111110 (8T mark). In other words, the signal patterns are preferably comprised of combinations of the following signal patterns:

0110 (2T)
01110 (3T)
011110 (4T)
0111110(5T)
01111110 (6T)
011111110 (7T)
0111111110 (8T).

Figure 4A:
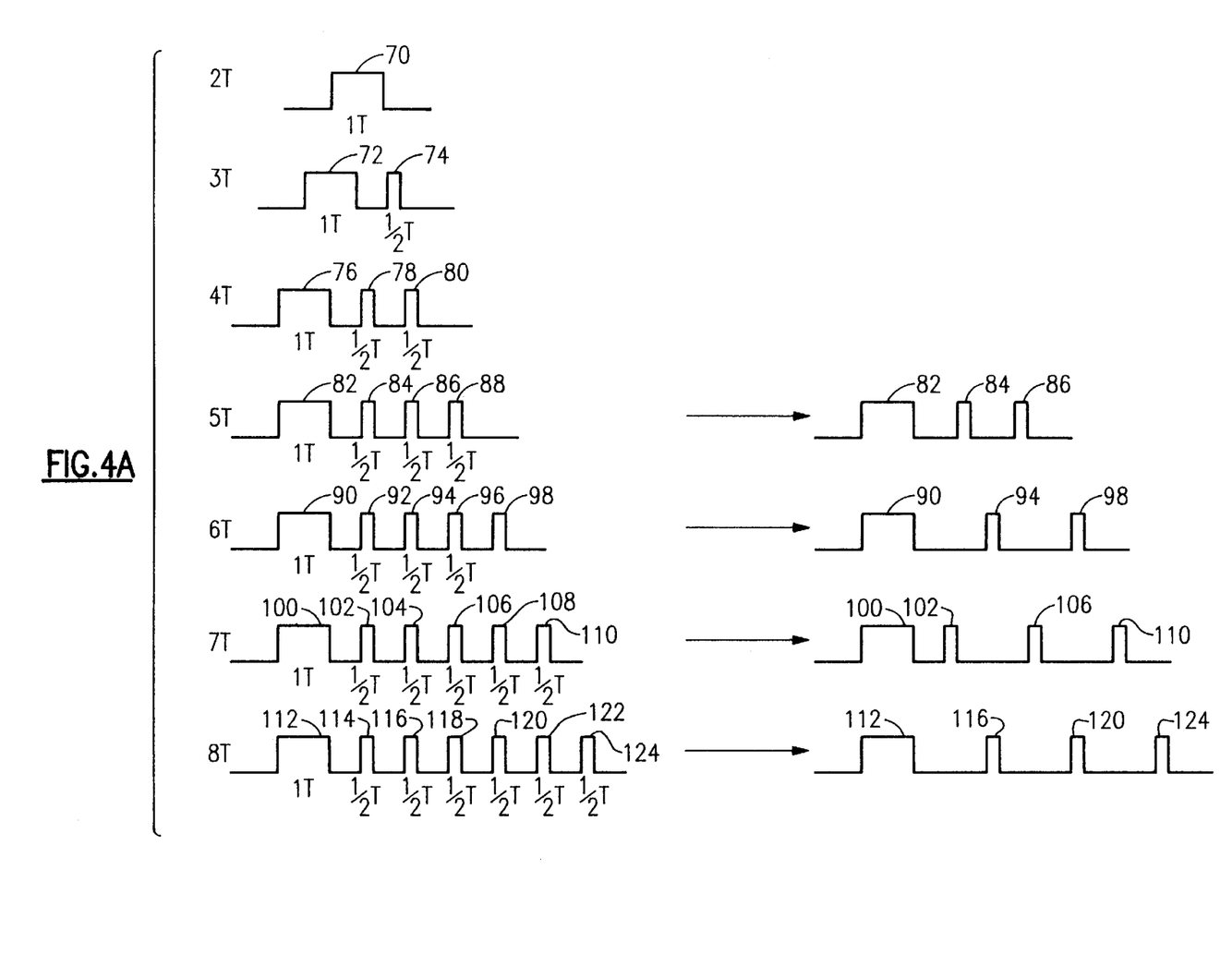
FIG. 4A shows exemplary pulse sequence waveforms for various periods and corresponding pulse sequence waveforms after the removal of every other pulse in accordance with a preferred embodiment of the present invention.

FIG. 4A (left column) shows exemplary pulse sequence waveforms for various periods, namely, 2T–8T pulse waveforms. As is known in the art, when writing a pulse sequence of a particular period (T) onto optical media 40. due to the heat expansion from the writing process the mark size is typically about twice the size of the period of the pulse sequence. For example, with momentary reference to FIG. 2 and 4A, to form a 4T mark size on optical disk 40, a pulse sequence of 1T, ½T. ½T is typically used. Similarly, to form an 8T mark size on optical disk 40, a pulse sequence of 1T, ½T, ½T, ½T, ½T, ½T, ½T is typically used.

Figure 4B:
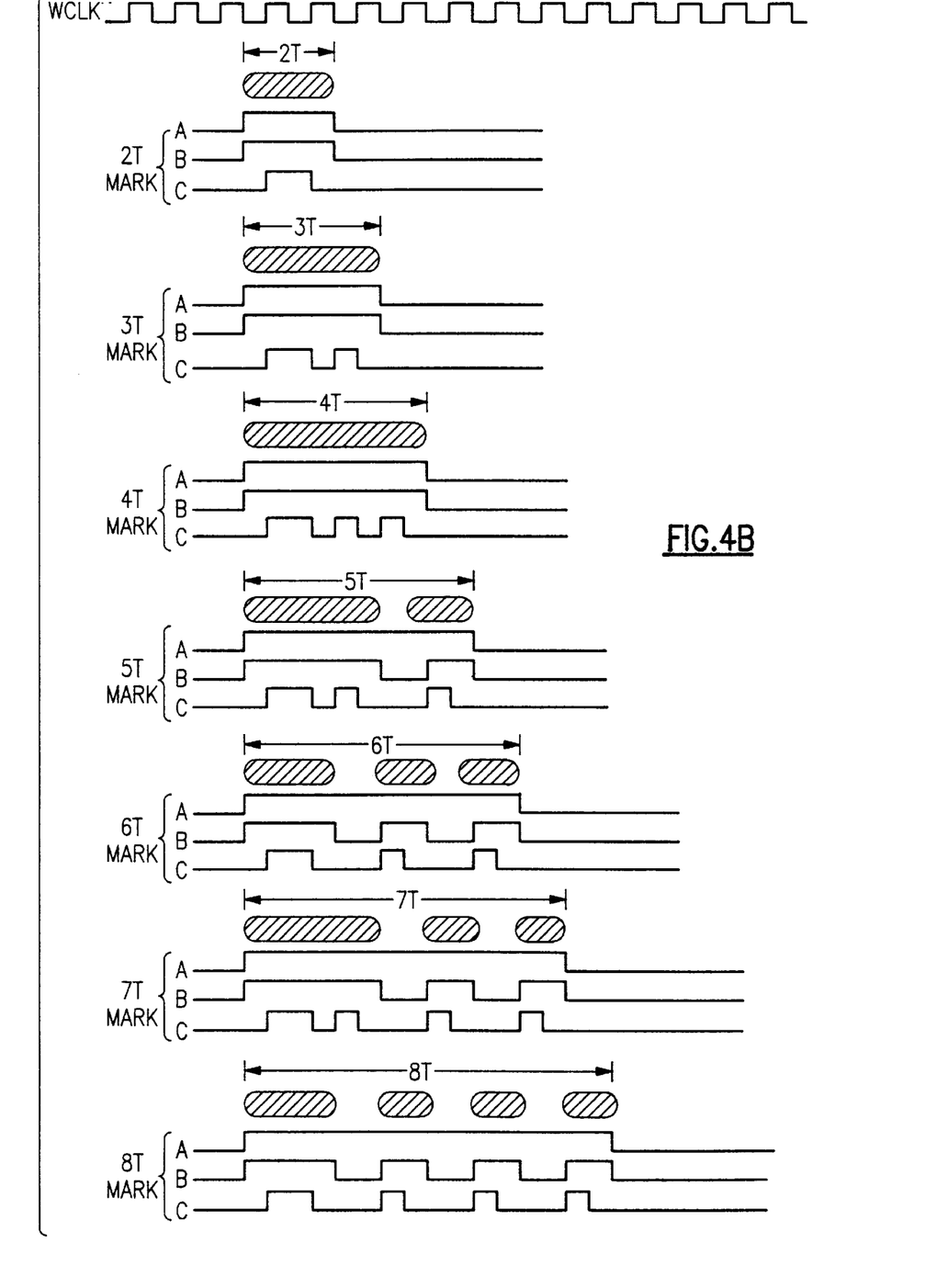
FIG. 4B shows an exemplary representation of the recording method by showing an exemplary write clock 22 corresponding to exemplary encoded data patterns (line "A") and corresponding written magnetic domains for 2T–8T marks in accordance with a preferred embodiment of the present invention (the delete control signal is shown on line "B" and the write pulse is shown on line "C"); and,.

FIG. 4B shows an exemplary representation of a preferred recording method by showing an exemplary write clock 22 corresponding to exemplary encoded data patterns (each line "A") having written magnetic domains for 2T–8T marks in accordance with the aforementioned reduced signal patterns. An exemplary delete control signal developed by digital logic 26 is shown on each line "B" and an exemplary write pulse in accordance with the present invention is shown on each line "C".

With reference to FIG. 3A, to suitably remove a predetermined number of pulses from a pulse signal pattern, each signal pattern is preferably sent through any suitable logic processor 26 capable of removing a predetermined number of pulses from a signal pattern. In a preferred embodiment, digital logic processor 26 is a clocked logic circuit having a Boolean logic function which is suitably programmed into processor 26 to process the input signal. By preferably adding gates to the inputs of the basic circuit, the digital logic suitably responds to input levels during the occurrence of a synchronous clock 22 pulse. In other words, the digital logic suitably responds to an input synchronous clock transition from a low-level (binary 0) to a high-level (binary 1) signal such that 50% of the period is low-level and 50% of the period is high-level. Thus, clock 22 suitably changes polarity from 0 to 1 every period such that when the clock pulse goes to 1, the input reaches the digital logic. Moreover, in a preferred embodiment, clock 22 also suitably communicates with NRZI converter 24 and/or write pulse generator 28 to suitably synchronize the entire process.

The gating logic at the input of processor 26 suitably defines the function of the Boolean logic. Therefore, the input signal patterns are suitable processed according to the Boolean logic function such that certain pulses in input signal patterns are suitably removed resulting in reduced pulse output signal patterns. The reduced pulse output signal patterns comprise any suitable signal pattern series capable of generating marks with reduced width.

More particularly, the Boolean logic function preferably removes every other ½T pulse from the input pulse sequence. However, because the pulses located at either end of a sequence help define the pulse sequence, the end pulses are preferably left unaltered. FIG. 4A shows exemplary pulse sequence waveforms for various periods (left column) and corresponding pulse sequence waveforms after the removal of every other ½T pulse (right column) in accordance with a preferred embodiment of the present invention.

As seen in FIGS. 4A and 4B, the 2T and 3T pulses include only one and two pulses, respectfully. Consequently, all of the pulses in the 2T and 3T pulse sequences are "end" pulses, and therefore, are preferably not altered by processor 26. The 4T pulse is also not altered because it typically experiences less than –30 dB, so substantial ATC problems do not often occur. Processor 26 suitably removes every other ½T pulse from the remaining pulse sequences, namely the 5T, 6T, 7T and 8T pulse sequences. Specifically, as best shown in FIG. 4A, in a preferred embodiment, one ½T pulse 86 is suitably removed from a 5T sequence, two ½T pulses 92,96 are suitably removed from a 6T sequence, two ½T pulses 104,108 are suitably removed from a 7T sequence, and three ½T pulses 114,118,122 are suitably removed from an 8T sequence. While the pulse removal described above is a preferred embodiment, one of ordinary skill in the art will appreciate that any suitable combination of pulse removal which results in a mark of reduced width written onto an optical disk can be used.

To continue the writing process, the reduced pulse signal patterns are next preferably sent through write pulse generator 28 which is any suitable write pulse generator capable of transforming signal patterns into pulses. In a preferred embodiment, write pulse generator 28 suitably converts the reduced pulse signal patterns into corresponding pulse sequences which are transmitted to write power 30, write power 32 or write power 34. Write powers 30, 32, 34 are any write powers capable of writing power information to laser diode driver 36 and incorporating cool down pulses into the pulse sequences. In a preferred embodiment, write power 30 suitably writes integer pulses to laser diode driver 36, write power 32 suitably writes ½ pulses to laser diode driver 36 and write power 34 suitably writes cool down pulses to laser diode driver 36. After receiving the write power information, laser driver 36 preferably communicates with laser 38 to suitably send laser 38 the specific lasing instructions.

By suitably reducing the marks which are greater than 4T, the effects of blooming are suitably reduced (see reduced width at end of written marks in FIG. 5. as compared to FIG. 2), so consequently, the ATC is reduced in substantial accordance with the following chart:

| Data Pattern | Crosstalk |
| --- | --- |
| 2T mark, 2T space | –36 dB |
| 3T mark, 3T space | –33 dB |
| 4T mark, 4T space | –30 dB |
| 5T mark, 5T space | –24 dB |
| 6T mark, 6T space | –22 dB |
| 7T mark, 7T space | –20 dB |
| 8T mark, 8T space | –18 dB |

As is evident from the above chart, the 8T pattern has improved from –14 dB to –18 dB, so the adjacent 8T pattern is approximately 10% of the amplitude of the 2T pattern. Because the amount of the adjacent track signal pattern which is sensed by the read focused spot is approximately 10% of the amplitude of the 2T pattern, excessive jitter is substantially reduced, thereby increasing the reliability in the read channel .

FIG. 3B shows a schematic representation of preferred optical components of an exemplary optical disk writer 50 in accordance with a preferred embodiment of the present invention For simplicity and because optical disk writers are generally known, optical disk writer 50 will only be generally described. While a preferred embodiment of the specific components and arrangement of the components will be described below, it will be appreciated by one of ordinary skill in the art that alternative components and alternative arrangements of the components can be configured to achieve a similar system which suitably reduces the width and effect of blooming of the marks written onto optical disk 40.

With respect to FIG. 3, writing laser 38 is any suitable light source capable of reading marks on an optical media but preferable is a semiconductor 685 nm red laser. The divergent light emanating from laser 38 is preferably collimated by collimator 52 and then suitably plane polarized by polarizer 54. The light then preferably travels through any suitable optical arrangement 56 configured for writing a mark onto optical disk 40. The light is then preferably reflected into objective lens 58. Objective lens 58 suitably focuses the light onto optical disk 40 while resting upon actuator 60. As is known by one of ordinary skill in the art, actuator 60 preferably receives feedback from detectors wherein the feedback is analyzed by actuator 60 such that actuator 60 suitably adjusts objective lens 58 thereby providing optimum control of the light beam onto optical disk 40 by any known method. When the light beam heats a specific location on disk 40, thereby reducing the magnitizing force in optical disk 40 from about 10,000 Oersted to about 240 Oersted, external magnetic field 62 (which is preferably a magnet of at least 240 Oersted) under disk 40, now having sufficient magnetizing force to realign the magnetic vectors, suitably reverses predetermined magnetic fields in disk 40 to correspond to the signal information in the light beam.

Figure 5:
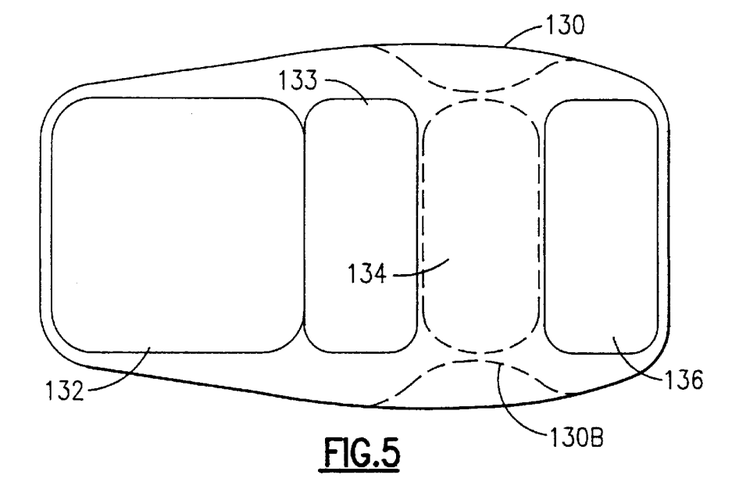
FIG. 5 shows a schematic diagram of a mark formed from a 5T pulse sequence and comprised of a plurality of pulses with a dotted line showing an exemplary reduced width of the mark after removal of a ½T pulse in accordance with a preferred embodiment of the present invention.

As mentioned above in the prior art, the light beam suitably heats optical disk 40 in accordance with the pulse sequence. More particularly, FIG. 5 shows a prior art formation of substantially wide mark 130 written on an optical disk 40 as a result of, for example, a 5T pulse sequence. With reference to FIG. 5, when forming mark 130 on optical disk 40, the pulse sequence (which for this 5T example preferably includes pulses 82,84,86,88 (see FIG. 4A, left column)) suitably instructs the laser to adjust and pulse the laser power, thereby suitably depositing adjacent marks 132,133, 134,136 onto optical media 40. When forming marks on optical media 40. laser 38 preferably initially heats optical disk 40 by preferably applying an approximately 0.53 um wide beam of about 8 mW on an approximately 0.5 um area. After reaching the maximum heat, laser 38 preferably holds the heat constant while forming the mark, then preferably cools down when completing the mark. Therefore, when substantially adjacent marks exist, as in the prior art a substantial amount of "cooling down" time is not typically available before the laser must increase the heat of disk 40 in preparation for beginning the next mark.

Moreover, in the prior art, the excessive heat that exists typically causes blooming. Consequently, when blooming occurs on prior art substantially adjacent marks 132,133, 134,136 (see FIG. 5), the blooming of each mark effectively merges all of the marks together, thereby forming substantially wide mark 130. Accordingly, the adjacent track crosstalk (ATC) typically proportionately increases as the number of pulses in the input pattern increases. ATC increases because, when writing to a high density optical disk, the effect of blooming of wider marks is sensed by the focused spot in adjacent tracks which typically causes increased ATC.

However, in accordance with a preferred embodiment of the present invention, every other ½T pulse is preferably removed from the pulse sequence (see FIG. 4A, right column, and FIG. 4B), as discussed above. In this example, and as discussed above, ½T pulse 86 is preferably removed from the 5T pulse sequence. The removal of pulse 86 preferably eliminates the formation of mark 134 (see FIG. 5), so consequently, after formation of mark 133, the laser beam has additional time to cool down before beginning the formation of mark 136. The "dotted line" 130B in FIG. 5 shows the outline of the 5T mark formed from a signal pattern with pulse 78 removed. The reduction in the width of mark 130B is substantially a direct result of the increased time for the "cooling down" between mark formations. When forming marks with less pulses, the effect of blooming is substantially reduced. Thus, because of the reduction in blooming, the problems associated with ATC, whereby adjacent track information is recorded, is substantially reduced.

While the present invention has been described in conjunction with preferred and alternate embodiments set forth in the drawing figures and the specification, it will be appreciated that the invention is not so limited. For example, the method and apparatus for removing a predetermined number of pulses from a signal pulse sequence is not only applied when writing to an optical disk, but can be used for any application which requires altered pulse sequences. Moreover, other sizes, shapes, materials and components can be incorporated into the writing device 50. Various modifications in the selection and arrangement of components and materials may be made without departing from the spirit and scope of the invention as set forth in the appended claims.

We claim:

1. An apparatus for reducing a width of a mark written into an optical media, comprising:
   a convertor configured to convert input signals to a first signal pattern having a plurality of pulses;
   a processor configured to remove a predetermined amount of said pulses from said first signal pattern thereby forming a second signal pattern having a reduced number of pulses;
   a write pulse generator configured to generate a pulse sequence waveform substantially corresponding to said second signal pattern;
   a laser diode driver configured to formulate instructions for implementing said pulse sequence waveform; and,
   a laser configured to create a plurality of marks on the optical media in accordance with said instructions.

2. The apparatus of claim 1, further comprising:
   at least one write power device configured to incorporate cool down pulses in said pulse sequence waveform.

3. The apparatus of claim 1, further comprising:
   a synchronous clock in communication with at least one of said convertor, said processor and said write pulse generator.

4. The apparatus of claim 1, wherein said input signals are 1, 7 Run Length Limited Code.

5. The apparatus of claim 1, wherein said convertor is a Non-Return to Zero convertor.

6. The apparatus of claim 1, wherein said processor is a clocked flip-flop gated circuit.

7. The apparatus of claim 1, wherein said first signal pattern having a plurality of ½T pulses and said processor is a processor configured to remove every other ½T pulse from said first signal pattern thereby forming the second signal pattern having a reduced number of pulses.

8. The apparatus of claim 1, wherein said second signal pattern for a 5T pattern includes a 1T pulse, ½T pulse and ½T pulse.

9. The apparatus of claim 1, wherein said second signal pattern for a 6T pattern includes a 1T pulse, ½T pulse and ½T pulse.

10. The apparatus of claim 1, wherein said second signal pattern for a 7T pattern includes a 1T pulse, ½T pulse, ½T pulse and ½T pulse.

11. The apparatus of claim 1, wherein said second signal pattern for a 8T pattern includes a 1T pulse, ½T pulse, ½T pulse and ½T pulse.

12. An optical media comprising marks formed according to the apparatus of claim 1.

13. A method for reducing the width of a mark written into an optical media comprising the steps of:

converting input signals to a first signal pattern having a plurality of pulses, including ½T pulses;

removing a predetermined amount of said pulses from said first signal pattern thereby forming a second signal pattern having a reduced number of pulses;

generating a pulse sequence waveform substantially corresponding to said second signal pattern;

formulating instructions to implement said pulse sequence waveform; and creating marks on an optical media in accordance with said instructions.

14. The method of claim 13, further comprising:

the step of incorporating cool down pulses in said pulse sequence waveforms.

15. The method of claim 13, further comprising:

the step of synchronizing at least one of a convertor, a processor and a write pulse generator.

16. The method of claim 13, wherein said step of converting said input signals includes converting 1,7 Run Length Limited Code input signals.

17. The method of claim 13, wherein said step of converting includes converting using a Non-Return to Zero convertor.

18. The method of claim 13, wherein said step of removing includes removing said pulses with a clocked digital logic gated circuit.

19. The method of claim 13, wherein said step of removing includes removing every other ½T pulse from said first signal pattern thereby forming the second signal pattern having a reduced number of pulses.

20. The method of claim 13, wherein said step of removing includes removing a ½T pulse from a 5T first signal pattern.

21. The method of claim 13, wherein said step of removing includes removing two ½T pulses from a 6T first signal pattern.

22. The method of claim 13, wherein said step of removing includes removing two ½T pulses from a 7T first signal pattern.

23. The method of claim 13, wherein said step of removing includes removing three ½T pulses from an 8T first signal pattern.

24. An optical media comprising marks formed according to the method of claim 12.

25. An apparatus for reducing a width of a mark written into an optical media including:

a convertor means for converting input signals to a first signal pattern having a plurality of pulses;

a processor means for removing a predetermined amount of said pulses from said first signal pattern thereby forming a second signal pattern having a reduced number of pulses;

a write pulse generator means for generating a pulse sequence waveform substantially corresponding to said second signal pattern;

a laser diode driver means for formulating instructions for implementing said pulse sequence waveform; and a laser means for creating marks on the optical media in accordance with said instructions.

26. The apparatus of claim 25, further comprising:

at least one write power means configured to incorporate cool down pulses in said pulse sequence waveform.

27. The apparatus of claim 25, further comprising:

a synchronous clock in communication with at least one of said convertor means, said processor means and said write pulse generator means.

28. The apparatus of claim 25, wherein said input signals are 1,7 Run Length Limited Code.

29. The apparatus of claim 25, wherein said convertor means is a Non-Return to Zero convertor.

30. The apparatus of claim 25, wherein said processor means is a clocked flip-flop gated circuit.

31. The apparatus claim 25, wherein said first signal pattern having a plurality of ½T pulses and said processor means is configured to remove every other ½T pulse from said first signal pattern thereby forming said second signal pattern having a reduced number of pulses.

32. The apparatus of claim 25, wherein said second signal pattern for a 5T pattern includes a 1T pulse, ½T pulse and ½T pulse.

33. The apparatus of claim 25, wherein said second signal pattern for a 6T pattern includes a 1T pulse, ½T pulse and ½T pulse.

34. The apparatus of claim 25, wherein said second signal pattern for a 7T pattern includes a 1T pulse, ½T pulse, ½T pulse and ½T pulse.

35. The apparatus of claim 25, wherein said second signal pattern for a 8T pattern includes a 1T pulse, ½T pulse, ½T pulse and ½T pulse.

* * * * *